United States Patent [19]

Reddy

[11] Patent Number: 4,886,096

[45] Date of Patent: Dec. 12, 1989

[54] EVAPORATIVE EMISSION CONTROL SYSTEM

[75] Inventor: S. Raghuma Reddy, W. Bloomfield, Mich.

[73] Assignee: General Motor Corporation, Detroit, Mich.

[21] Appl. No.: 162,153

[22] Filed: Feb. 29, 1988

[51] Int. Cl.$^4$ .............................................. B65B 31/00
[52] U.S. Cl. ...................................... 141/45; 123/518; 220/85 VS; 220/85 VR
[58] Field of Search ........... 220/55 VR, 85 VS, 86 R, 220/85 R; 141/44–46, 98; 123/518, 519, 520

[56] References Cited

U.S. PATENT DOCUMENTS

| | | | |
|---|---|---|---|
| 2,790,307 | 4/1957 | Ayres | 220/85 VS |
| 2,894,736 | 7/1959 | Wentworth | 261/72.1 |
| 3,618,314 | 11/1971 | Krebs | 60/297 |
| 3,756,291 | 9/1973 | McGahey et al. | 141/45 |
| 3,884,204 | 5/1975 | Krautwurst et al. | 123/518 |
| 3,903,708 | 9/1975 | Mair | 220/85 VR |
| 4,134,271 | 1/1979 | Datis | 220/85 VS |
| 4,446,838 | 5/1984 | Sukuki et al. | 123/520 |
| 4,598,741 | 7/1986 | Johnson | 141/5 |

Primary Examiner—Ernest G. Cusick
Attorney, Agent, or Firm—Patrick M. Griffin

[57] ABSTRACT

An improved evaporative emission control system uses a charcoal canister, but, rather than air purging the canister of stored vapors, desorbs them, substantially without air, by application of a vaccum and reabsorbs the purged vapors into the liquid fuel in the tank. Any effect on driveability and exhaust emissions is thereby avoided, and canister capacity and efficiency are increased.

3 Claims, 1 Drawing Sheet

EVAPORATIVE EMISSION CONTROL SYSTEM

BACKGROUND OF THE INVENTION

Conventional evaporative emission control systems, generally called evap systems, use a canister of adsorptive activated charcoal to store fuel vapors that would otherwise be lost to atmosphere, both the vapors vented from the carburetor bowl after engine shut down and the vapors formed in the fuel tank as the car sits. When the engine starts, these adsorbed vapors are then desorbed, or purged as it is generally known, by blowing air through the canister, with the air-vapor mixture then being fed to the engine for burning. A number of problems are presented by the conventional, engine burning method of stored vapor disposal. The purge air is generally pulled by manifold vacuum, which is strongest at just the time when the engine has the least ability to accept the vapors, that is, during idle or low power. Even if that problem is dealt with by a proportioning purge valve or through a separate source of purge air, the feeding of the purged air-vapor mixture to the engine must somehow be controlled in order to avoid adversely affecting driveability. Much of the patent activity in the evaporative emission control area treats the engine burning vapor disposal method as a given, and then proposes some system, often a complex system, to deal with the driveability problem. This is a problem that threatens to worsen in the future if and when new government regulations require that the tank vapors displaced during fuel fill, which are now generally vented to atmosphere, also be recovered. The capacity both of the conventional canister to store the extra vapor load and of the engine to burn it will be challenged.

SUMMARY OF THE INVENTION

The invention avoids the problems noted above by introducing the desorbed vapors from the canister back into the liquid fuel in the fuel tank, where they are absorbed, rather than burning them in the engine.

In the preferred embodiment, all of the fuel vapors from every potential loss point, including the carburetor bowl, the fuel tank, and the fuel filler pipe are fed to a charcoal canister in conventional fashion through conventional lines, inlets and control valving. Air introduced with the vapors is not adsorbed, but is allowed to escape to atmosphere through a suitable outlet. The vapors are not desorbed by the conventional method of blowing air through the canister, however. Instead, when the engine is started, the canister outlet and the vapor inlets are blocked off by suitable valves, and a vacuum is applied to the canister, which is done with a separate vacuum pump in the embodiment disclosed. That vacuum desorbs the stored fuel vapors and draws them out of the canister, along with substantially no air. The desorbed vapors then travel through a one way valve and through a line that opens into the liquid fuel in the tank. Being fuel vapors only, with essentially no entrained air, the desorbed vapors are easily reabsorbed into the liquid fuel. When there are no more stored vapors in the canister to draw out, the negative pressure in the canister goes up sharply, which signals the turning off of the vacuum pump and the reopening the canister inlets and outlet so that canister loading can begin again. There is the potential for handling a much larger volume of vapor, as well as handling it more efficiently, since the liquid fuel has a large capacity to reabsorb fuel vapors.

It is, therefore, a broad object of the invention to totally avoid the driveability problems inherent in a conventional evaporative emission control system.

It is another object of the invention to increase the capacity and efficiency of the emission control system.

It is yet another object of the invention to provide a system that will gather fuel vapors, from every potential loss point, in a storage canister or other means for separating air from the fuel vapors, and which vacuum purges the fuel vapors so gathered to the fuel tank where the purged vapors can be reabsorbed in the liquid fuel.

It is still another object of the invention to provide an improved method of purging stored vapors from a canister by vacuum purging fuel vapors alone from the canister, rather than purging with outside air, and then reabsorbing the purged vapors into the liquid fuel, rather than feeding them to the engine for burning.

BRIEF DESCRIPTION OF THE DRAWINGS

These and other objects and features of the invention will appear from the following written description, and from the drawings, in which.

DESCRIPTION OF THE PREFERRED EMBODIMENT

Figure 1:
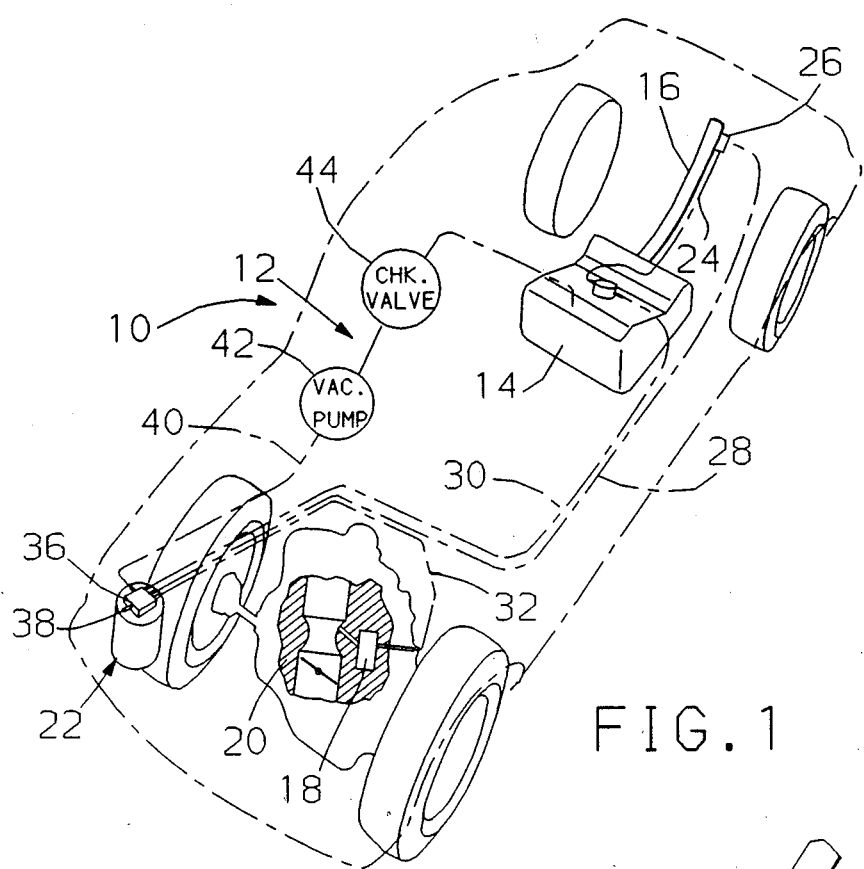
FIG. 1 is a partially schematic drawing of a vehicle incorporating a preferred embodiment of the system of the invention.

Referring first to FIG. 1, a vehicle 10 is shown incorporating a preferred embodiment of the evaporative emission control system of the invention, which is designated generally at 12. Vehicle 10 has several conventional components that are served by the system 12, including a fuel storage tank 14 with a filler pipe 16, a carburetor 18, and a throttle body 20. While it doesn't have the carb bowl losses, a vehicle with a fuel injection system would be a suitable candidate for the invention as well, since it still has an equal or greater volume of tank vapors to handle. System 12 includes several basically conventional components as well, which is a great advantage, in that the invention can be all the more easily incorporated into existing systems.

Still referring to FIG. 1, system 12 includes a vapor storage canister, designated generally at 22, which could be created from a conventional closed bottom canister. More detail about canister 22 will be given below. Although canister 22 is purged in a very different manner, it stores vapors just as a normal storage canister would, and could use the same valving and inlets. A typical system would have a vapor inlet into canister 22 from all potential vapor loss points. This could, as shown, include a vapor feed line 24 running from the top of tank 14 to a refueling vapor control valve 26 at the top of filler pipe 16, and another vapor feed line 28 running from valve 26 to canister 22. Another feed line 30 would run directly from the top of tank 14 to canister 22. When the tank filler pipe 16 was closed, valve 26 would block line 28 and 24, and tank vapors generated under normal operation, generally referred to as diurnal losses, would be fed through line 30 to canister 22 and adsorbed therein. During refueling, valve 26 would seal around the fuel dispensing nozzle to block vapor loss to atmosphere, and would open lines 28 and 24, so that tank vapors displaced by the fill operation could easily exit both from tank 14 and from filler pipe 16 to canister 22. Finally, a conventional feed line 32 from carburetor 18 to canister 22 would take care of carburetor losses, generally referred to as hot soak losses.

Figure 2:
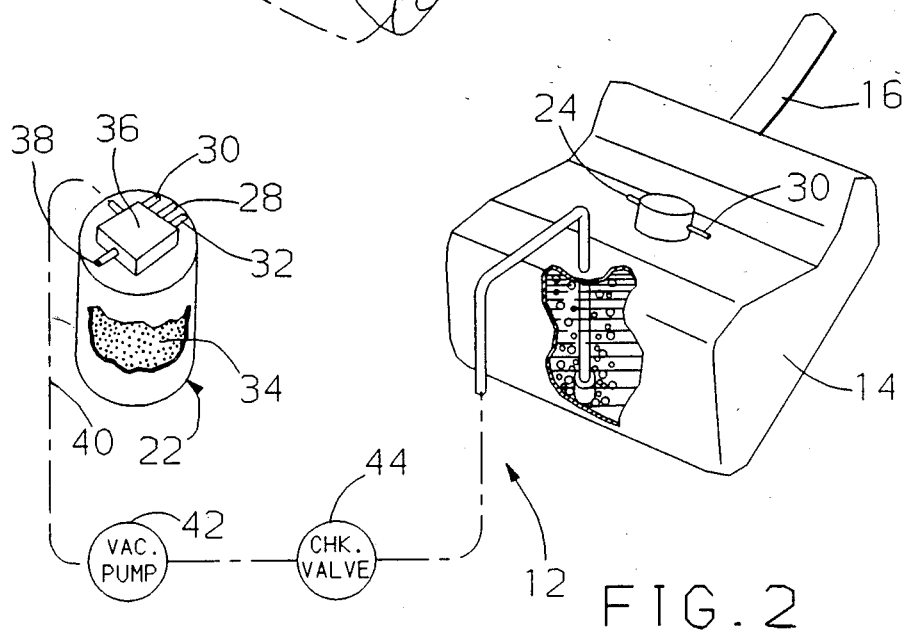
FIG. 2 is a partially schematic drawing illustrating the purge cycle of the system of the invention.

Referring next to FIGS. 1 and 2, canister 22 has a charge of conventional activated charcoal granules 34 that adsorb and store fuel vapors that pass over them. A canister control means, referred to generally at 36, could encompass several structures, including a conventional valving arrangement, generally called a canister control valve, to open and close the various vapor inlets of lines 28, 30 and 32 to canister 22 during canister loading. Examples of suitable canister control valves are well known in the art, and need not be illustrated in detail here. An outlet 38 would, in the embodiment disclosed, allow any air mixed with the entering fuel vapors to escape to atmosphere during canister loading. Outlet 38 is especially important when fuel fill loss vapors are to be recovered, which would have an appreciable amount of entrained air mixed with the fuel vapor. If appreciable air were not present in the inlet fuel vapors, then an outlet 38 might not be needed. If air is present, however, the an outlet like 38 is needed as the granules 34 do not adsorb air, only vapor. This is a characteristic of fuel adsorption which, in a conventional evap system, is a drawback in the sense that clean air has to be forcibly drawn from atmosphere, through the canister and over the granules 34 to desorb the stored vapors. Currently, manifold vacuum is used to power the air purge, but, in the future, a separate pump or blower may have to be added in order to provide enough purge. However, that drawback is avoided entirely in the invention, as will appear next.

Referring next to FIG. 2, another line 40 runs from canister 22, through a vacuum source provided by a vacuum pump 42, through a one way valve 44. and finally into tank 14 where it opens into the liquid fuel, near the bottom of tank 14. Canister control means 36, in addition to the conventional canister control valving, would have several selectively energizable solenoids, not illustrated in detail, which would block or unblock the lines 28, 30 and 32, as well as the outlet 38 and the line 40. During canister loading, lines 28, 30 and 32 would be unblocked (although their opening and closing could still be controlled by a conventional canister control valve), outlet 38 would be unblocked, and line 40 would be blocked. When the engine is started, a suitable circuit tied to the ignition circuit would block lines 28, 30, 32 and outlet 38, while opening line 40, leaving line 40 as the only open line from tank 14 to canister 22. Then, also activated by the ignition circuit, vacuum pump 42 would apply a vacuum through line 40 to the otherwise sealed canister 22. Since the vacuum would see nothing but the adsorbed vapors in canister 22, it would desorb and draw them out, without substantial air, down line 40 and through one way valve 44, where they would exit into the liquid fuel in tank 14. Being substantially without entrained air, the desorbed vapors could then be easily absorbed in the liquid fuel in tank 14. When the vapors were entirely or substantially vacuum purged from the otherwise sealed canister 22, the negative pressure in canister 22 would shoot up rapidly. This steep, rapid increase in canister negative pressure could be read by a sensor and used to signal a suitable circuit, not illustrated, to turn off pump 42 and to signal the control means 36 to reopen the solenoids to unblock the lines 28, 30 and 32 and reopen the outlet 38 so that canister loading could begin again. Purge timing would be relatively simple to control, since if there were few vapors stored in canister 22, then the negative pressure would rise very steeply, automatically turning off pump 42 and reopening the inlets to canister 22 so that vapor storage could begin again.

There are many advantages to the invention over the conventional evap system. Foremost, there is no effect on driveability or exhaust emissions at all, since no purged vapor mixture is fed to the engine. A canister is still used, but there would none of the problems of air and liquid contamination that can occur when there is an opening for outside purge air to be pulled through, as with a conventionally purged canister. Nor would there be the problems of designing a granule bed to give proper vapor and air flow during purge.

Furthermore, the system of the invention, since it vacuum purges, rather than air purges, would lend itself very well to any suitable means other than a charcoal canister 22 that would separate the air from the fuel vapor or hydrocarbon content of an air-fuel vapor mixture. For example, a membrane that separated hydrocarbon components from a fuel vapor and air mixture could conceivably be used in place of charcoal canister 22, to separate and gather the fuel vapors apart from the air, with pump 42 being used to power the separation process and purge the fuel vapors alone to tank 14.

Since the valving and feed lines are basically conventional, and the canister 22 is not greatly different from a conventional canister, the system could be easily incorporated into existing vehicles. There is real potential for an increase in purge efficiency, especially in the purge after fuel refilling, since the canister will be warm from the recent vapor loading, and the recently added fuel will be relatively cool. This would aid both the vapor desorbtion in the canister 22 and the vapor absorption in tank 14. Vacuum purging canister 22 would lend itself favorably to the various canister heating schemes that have been proposed, as well, since only the fuel vapor would need to be heated, and not any indrawn outside air, which could be quite cold. The tank would have to be designed to keep some minimum level of fuel for the purged vapors to be absorbed in, but this would not be a problem after fuel fill, which is when the greatest volume of vapors are created. The system disclosed uses engine starting to initiate purge, which will generally be adequate, since it is then that vapors will usually be at a high level, either after fuel fill, or after carb bowl hot soak. Alternatively, some means could be provided to sense canister vapor level and to initiate purge if the vapor level in the canister 22 should reach a predetermined high level while the car sat, which could be a great advantage during hot weather. The engine would not have to run, of course, because the vapors are not disposed of by engine burning. There would be ample room for designing and trying new adsorbents specifically configured to operate efficiently under vacuum purging, as opposed to air purging. Therefore, it will be understood that the embodiment disclosed is capable of several variations within the spirit of the invention.

The embodiments of the invention in which an exclusive property or privilege is claimed are defined as follows:

1. In a vehicle having a liquid fuel tank and one or more potential loss points that produce a fuel vapor and air mixture, an evaporative emission control system, comprising;

a separation means for separating the fuel vapor from the air in said fuel vapor and air mixture, vapor inlets connecting said separation means to said potential loss points so as to separate and gather said vapors, a line connecting said separation means to said fuel tank and opening into the liquid fuel in said fuel tank, a vacuum source in said line, and, control means to energize said vacuum source and block said vapor inlets, thereby allowing said vacuum source to purge said vapors from said separation means, said control means also deenergizing said vacuum source and reopening said vapor inlets when said fuel vapors have been substantially purged from said separation means, whereby, a negative pressure may be applied to said separation means by said vacuum source, purging said separated fuel vapors substantially without air, which then travel to said fuel tank via said line to be absorbed in said liquid fuel, said control means deactivating when said vapors are substantially purged from said separation means.

2. In a vehicle having a liquid fuel tank and an emission control system including a vapor storage canister having vapor inlets that receive fuel vapors from one or more potential fuel vapor loss points, the improvement comprising;

a line connecting said cannister to said fuel tank and opening into the liquid fuel in said fuel tank, a vacuum source in said line, and, control means to energize said vacuum source and block said canister vapor inlets, said control means deenergizing said vacuum source and reopening said vapor inlets when the negative pressure in said canister rises steeply, whereby, a negative pressure may be applied to said canister by said vacuum source, thereby purging said stored fuel vapors from said canister, which purged fuel vapors then travel to said fuel tank via said line to be absorbed in said liquid fuel, said control means deactivating when said stored vapors are substantially purged from said canister and the negative pressure in said canister consequently rises steeply.

3. An evaporative emission control system for a vehicle having a liquid fuel tank and one or more potential fuel vapor loss points, comprising;

a vapor adsorbing canister, vapor inlets connected to said canister from said potential fuel vapor loss points through which liquid vapors are received and adsorbed, a line connecting said canister to said fuel tank and opening into the liquid fuel in said fuel tank, a vacuum source in said line, and, control means activated when the level of stored vapors in said canister has reached a predetermined level to energize said vacuum source and block said vapor inlets, said control means deenergizing said vacuum source and reopening said vapor inlets when the negative pressure in said canister rises steeply, whereby, a negative pressure may be applied to said canister by said vacuum source, thereby desorbing said adsorbed vapors, which desorbed fuel vapors then travel to said fuel tank via said line to be absorbed in said liquid fuel, said control means deactivating when said adsorbed vapors have been substantially desorbed from said canister and the negative pressure in said canister consequently rises steeply.

* * * * *